US012706447B2

(12) United States Patent
Muroi et al.

(10) Patent No.: US 12,706,447 B2
(45) Date of Patent: Aug. 11, 2026

(54) ELECTRICAL CONNECTION BOX

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Ryo Muroi, Osaka (JP); Hideyuki Kuboki, Osaka (JP); Yusuke Isaji, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 82 days.

(21) Appl. No.: 18/868,982

(22) PCT Filed: May 23, 2023

(86) PCT No.: PCT/JP2023/019101
§ 371 (c)(1),
(2) Date: Nov. 25, 2024

(87) PCT Pub. No.: WO2023/234113
PCT Pub. Date: Dec. 7, 2023

(65) Prior Publication Data

US 2025/0309626 A1 Oct. 2, 2025

(30) Foreign Application Priority Data

May 30, 2022 (JP) ................................ 2022-087618

(51) Int. Cl.
*H02G 3/16* (2006.01)
*B60R 16/023* (2006.01)
(Continued)

(52) U.S. Cl.
CPC .......... *H02G 3/16* (2013.01); *B60R 16/0239* (2013.01); *H01H 85/20* (2013.01); *B60R 16/02* (2013.01); *H01H 2085/208* (2013.01)

(58) Field of Classification Search
CPC ............................. H02G 3/16; B60R 16/0239
See application file for complete search history.

(56) References Cited

U.S. PATENT DOCUMENTS

2002/0061682 A1* 5/2002 Nakanishi .......... H01H 85/0417 439/620.33
2002/0076983 A1* 6/2002 Nakanishi .......... H01H 85/0417 439/620.27

(Continued)

FOREIGN PATENT DOCUMENTS

JP 03-077223 8/1991
JP 2002-124175 4/2002

(Continued)

OTHER PUBLICATIONS

International Search Report issued in WIPO Patent Application No. PCT/JP2023/019101, dated Aug. 15, 2023, along with an English translation thereof.

*Primary Examiner* — Hung V Ngo
(74) *Attorney, Agent, or Firm* — Greenblum & Bernstein, P.L.C.

(57) ABSTRACT

An electrical connection box includes a housing and a busbar attached to the housing. The housing includes a shared fuse mounting portion on which at least two fuses including large and small fuses of mutually different sizes are to be mounted. The fuse mounting portion includes: a large input-side fixing portion to which a large input termi- (Continued)

nal of the large fuse is to be fixed; a large output-side fixing portion to which a large output terminal of the large fuse is to be fixed; a small input-side fixing portion to which a small input terminal of the small fuse is to be fixed; and a small output-side fixing portion to which a small output terminal of the small fuse is to be fixed. The small input-side fixing portion and the small output-side fixing portion are arranged between the large input-side fixing portion and the large output-side fixing portion.

5 Claims, 8 Drawing Sheets

(51) Int. Cl.
*H01H 85/20* (2006.01)
*B60R 16/02* (2006.01)

(56) References Cited

U.S. PATENT DOCUMENTS

| | | | | |
|---|---|---|---|---|
| 2005/0272314 | A1 | 12/2005 | Kobayashi | |
| 2017/0358418 | A1* | 12/2017 | Carnick | H01H 85/0241 |
| 2019/0103738 | A1* | 4/2019 | Aichi | H01H 85/20 |
| 2022/0255302 | A1* | 8/2022 | Okumura | H05K 7/02 |

FOREIGN PATENT DOCUMENTS

| | | |
|---|---|---|
| JP | 2005-185002 | 7/2005 |
| JP | 2005-209509 | 8/2005 |
| JP | 2005-353322 | 12/2005 |
| JP | 2006-129608 | 5/2006 |
| JP | 2018-063928 | 4/2018 |

* cited by examiner 10
20
B1
23
P1
30
31
31A
31B
41B
31C
28
21
40(41)
50
22
33A
41C
32
(32A)
24
B1
33

ELECTRICAL CONNECTION BOX

TECHNICAL FIELD

The present disclosure relates to an electrical connection box.

BACKGROUND ART

Conventionally, an electrical connection box according to JP 2005-185002A (Patent Document 1 below) is known as an electrical connection box equipped with a fusible link. This electrical connection box includes a lower case and an upper case that is attached to cover the upper surface of the lower case. The upper surface of the lower case is provided with an input-side LA terminal connection portion, an output-side LA terminal connection portion, a first fusible link mounting portion adjacent to the LA terminal connection portion, a second fusible link mounting portion, a plurality of relay accommodating portions, and a fuse accommodating portion.

The fusible link mounted on the first fusible link mounting portion includes a main body portion, an input terminal portion protruding laterally from the lower end on one side of the main body portion, and an output terminal portion protruding from the lower end on another side of the main body portion in the opposite direction to the input terminal portion. The fusible link and the first fusible link mounting portion are fixed together by passing a bolt through a bolt hole in the first fusible link mounting portion and a bolt hole in the input terminal portion of the fusible link and fastening the bolt to a nut.

CITATION LIST

Patent Documents

Patent Document 1: JP 2005-185002A

SUMMARY OF INVENTION

Technical Problem

In general, the size of the mounted fusible link varies in some cases depending on the vehicle model and grade. For this reason, with a conventional electrical connection box, a dedicated electrical connection box needs to be designed to correspond to each size of fusible link, making it non-versatile and high in cost.

Solution to the Problem

The electrical connection box according to the present disclosure includes: a housing; and a busbar attached to the housing, in which the housing includes a shared fuse mounting portion on which at least two fuses including a large fuse and a small fuse of mutually different sizes are to be mounted, the fuse mounting portion includes: a large input-side fixing portion to which a large input terminal provided on one end of the large fuse is to be fixed; a large output-side fixing portion to which a large output terminal provided on another end of the large fuse is to be fixed; a small input-side fixing portion to which a small input terminal provided on one end of the small fuse is to be fixed; and a small output-side fixing portion to which a small output terminal provided on another end of the small fuse is to be fixed, and the small input-side fixing portion and the small output-side fixing portion are arranged between the large input side fixing portion and the large output-side fixing portion.

Advantageous Effects of the Invention

According to the present disclosure, at least two fuses of different sizes can be mounted in the same electrical connection box, thereby reducing cost.

BRIEF DESCRIPTION OF DRAWINGS

Figure 3:
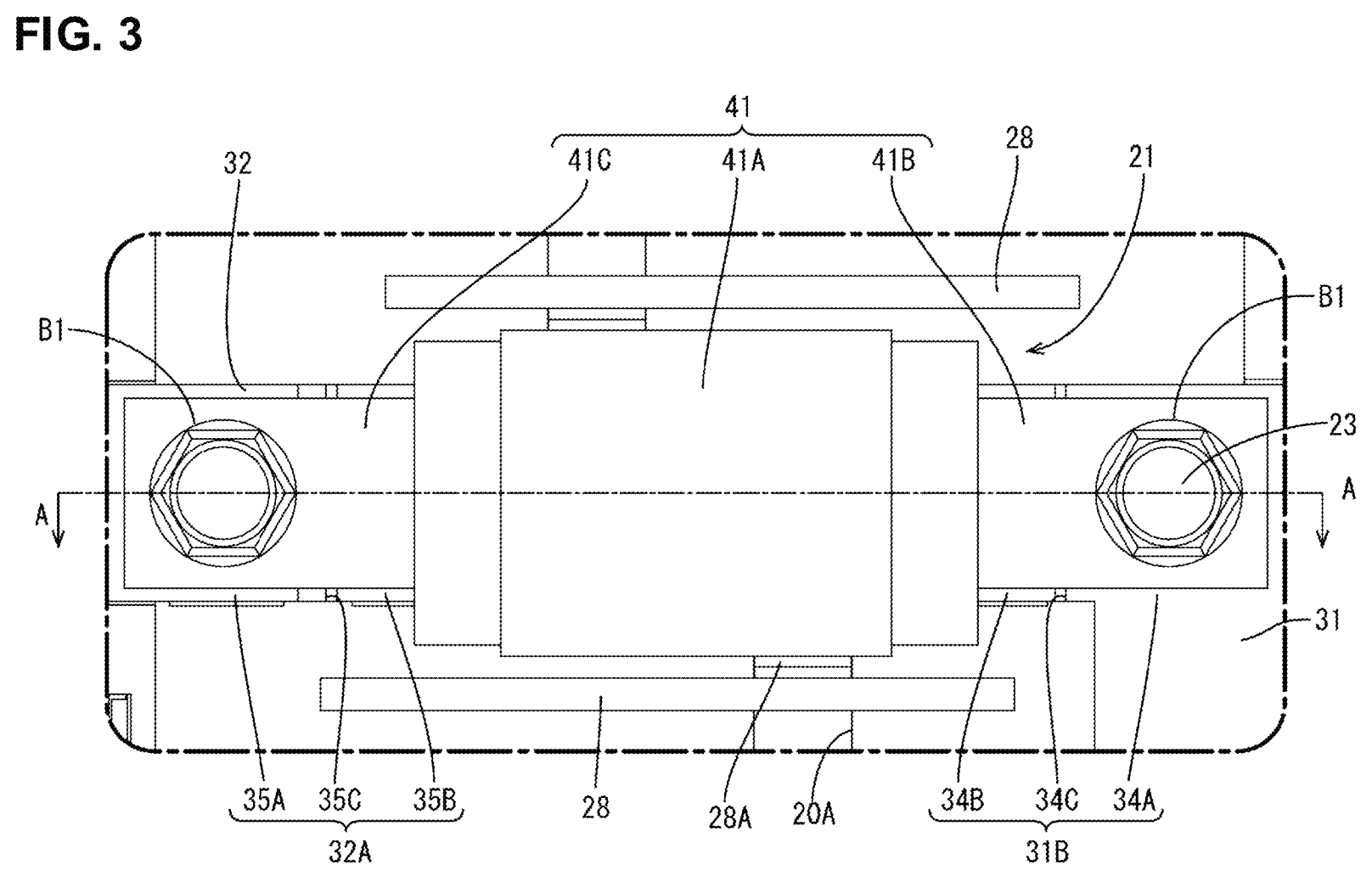

FIG. 3 is a partially enlarged plan view of the electrical connection box, showing an enlarged fuse mounting portion on which the large fuse is mounted.

FIG. 4 is a cross-sectional view taken along line A-A in FIG. 3.

FIG. 6 is a cross-sectional view taken along line B-B of FIG. 5.

Figure 7:
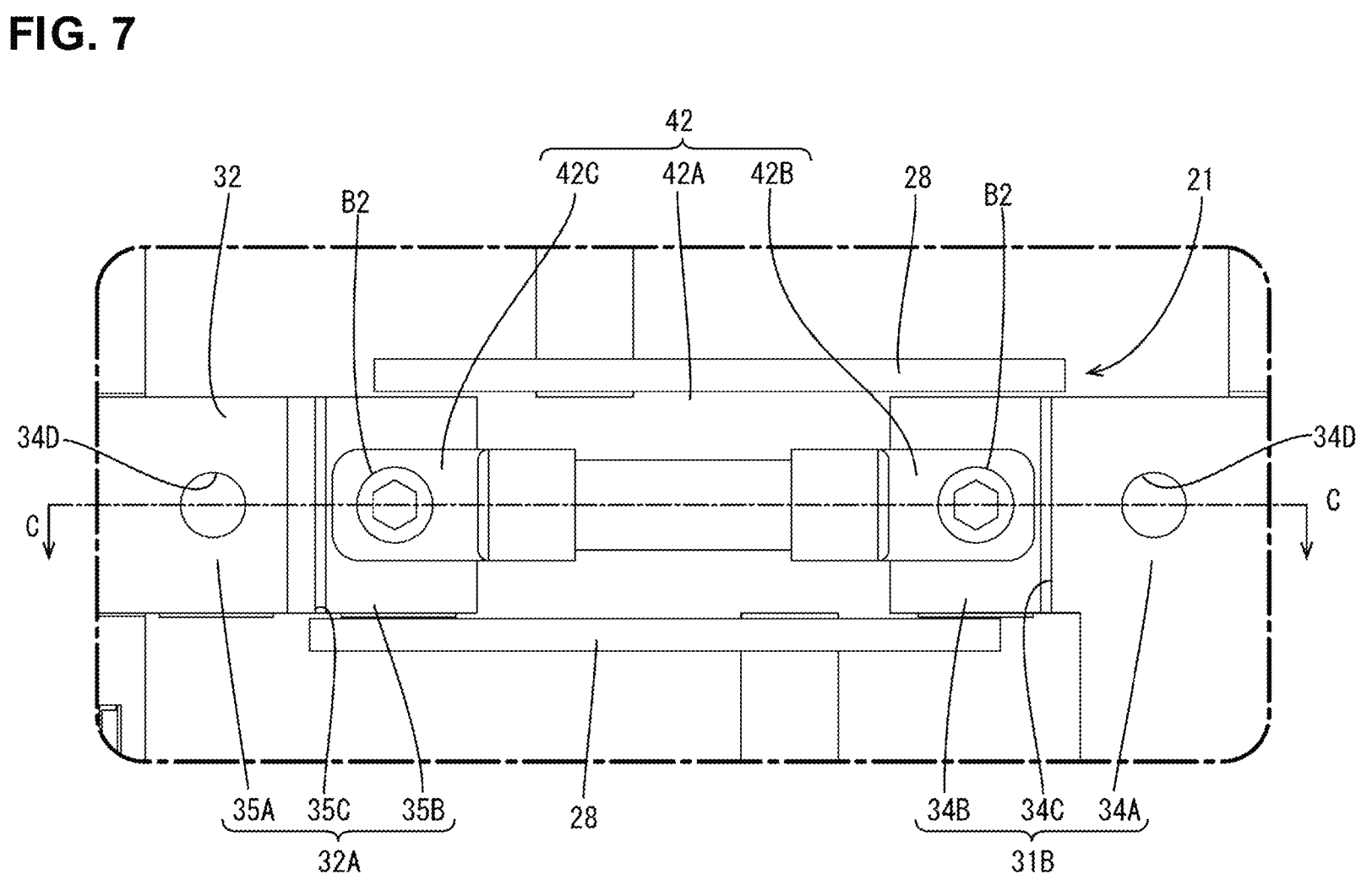

FIG. 7 is a partially enlarged plan view of the electrical connection box showing an enlarged view of a fuse mounting portion on which the small fuse is mounted.

FIG. 8 is a cross-sectional view taken along line C-C of FIG. 7.

OVERVIEW OF EMBODIMENTS OF THE INVENTION

Figure 1:
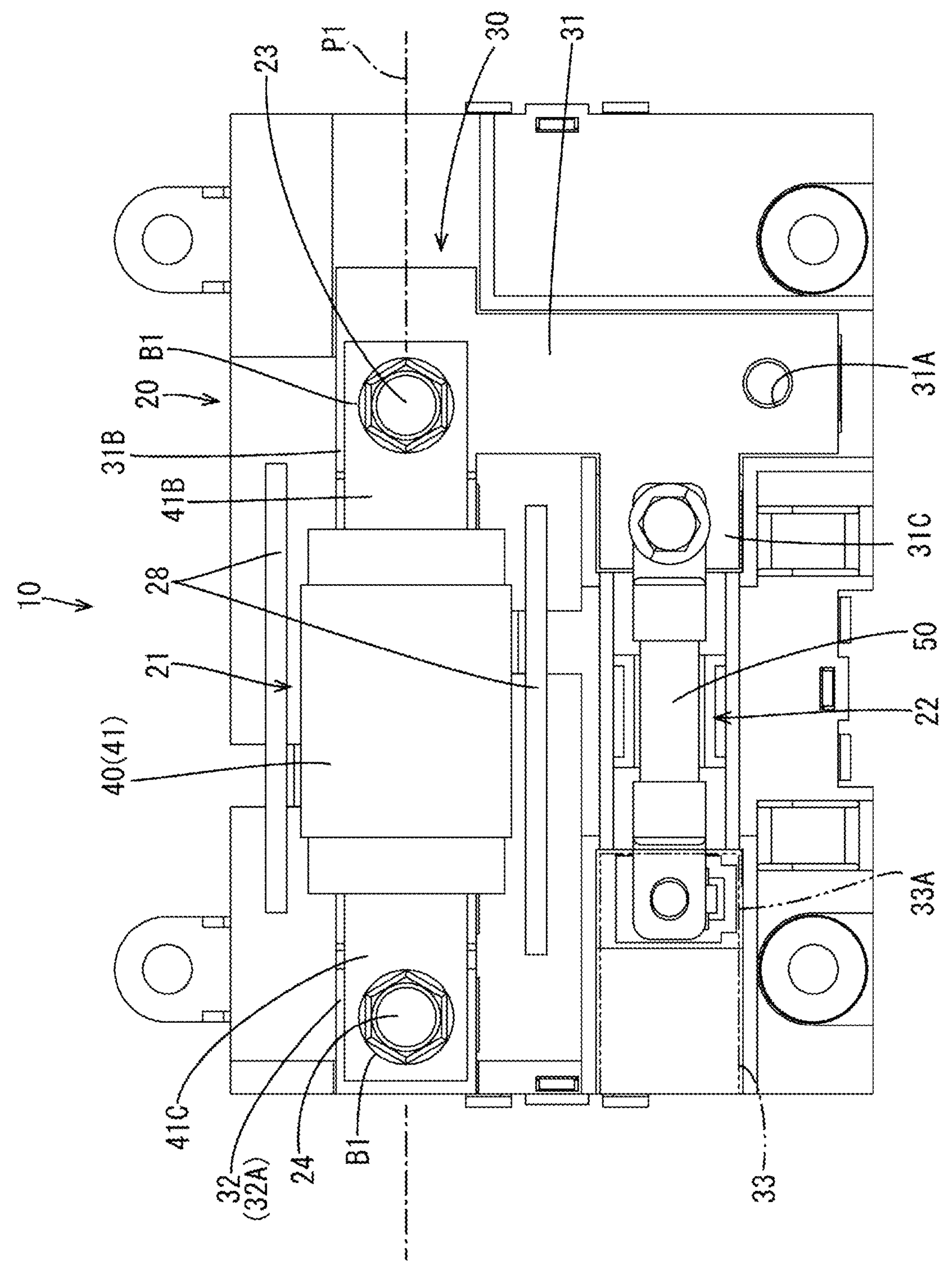
FIG. 1 is a plan view of an electrical connection box in which a large fuse is mounted.

Description of Embodiments of the Present Disclosure

First, embodiments of the present disclosure will be listed and described.

(1) An electrical connection box of the present disclosure includes: a housing; and a busbar attached to the housing, in which the housing includes a shared fuse mounting portion on which at least two fuses including a large fuse and a small fuse of mutually different sizes are to be mounted, the fuse mounting portion includes: a large input-side fixing portion to which a large input terminal provided on one end of the large fuse is to be fixed; a large output-side fixing portion to which a large output terminal provided on another end of the large fuse is to be fixed; a small input-side fixing portion to which a small input terminal provided on one end of the small fuse is to be fixed; and a small output-side fixing portion to which a small output terminal provided on another end of the small fuse is to be fixed, and the small input side fixing portion and the small output-side fixing portion are arranged between the large input-side fixing portion and the large output-side fixing portion.

In order to mount the large fuse on the fuse mounting portion, the large input terminal is fixed to the large input-side fixing portion and the large output terminal is fixed to the large output-side fixing portion. In order to mount the small fuse on the fuse mounting portion, the small input terminal is fixed to the small input-side fixing portion and the small output terminal is fixed to the small output-side fixing portion. Since the large fuse and the small fuse can thus be mounted in one fuse mounting portion, at least two fuses of different sizes can be mounted in the same electrical connection box, thereby reducing cost.

(2) It is preferable that the busbar includes: an input-side busbar having a large input-side connection portion that is to be fixed to the large input-side fixing portion while connected to the large input terminal and a small input-side connection portion that is to be fixed to the small input-side fixing portion while connected to the small input terminal; and an output-side busbar having a large output-side connection portion that is to be fixed to the large output-side fixing portion while connected to the large output terminal and a small output-side connection portion that is to be fixed to the small output-side fixing portion while connected to the small output terminal.

In order to connect the large fuse to the input-side busbar, the large input-side connection portion is fixed to the large input-side fixing portion together with the large input terminal, and in order to connect the large fuse to the output-side busbar, the large output-side connection portion is fixed to the large output-side fixing portion together with the large output terminal. In order to connect the small fuse to the input-side busbar, the small input-side connection portion is fixed to the small input-side fixing portion together with the small input terminal, and in order to connect the small fuse to the output-side busbar, the small output-side connection portion is fixed to the small output-side fixing portion together with the small output terminal. Since it is possible to select either the large fuse or the small fuse to connect the input-side busbar and the output-side busbar in this way, the same electrical connection box can be used for different vehicle models and grades.

(3) It is preferable that the large input-side connection portion and the small input-side connection portion are arranged at different height positions in a height direction orthogonal to a direction in which the large input-side connection portion and the small input-side connection portion are arranged side by side in a plan view, and the input-side busbar has an input-side level difference that connects the large input-side connection portion and the small input-side connection portion in a stepped shape, and the large output-side connection portion and the small output-side connection portion are arranged at different height positions in a height direction orthogonal to a direction in which the large output-side connection portion and the small output-side connection portion are arranged side by side in a plan view, and the output-side busbar has an output-side level difference that connects the large output-side connection portion and the small output-side connection portion in a stepped shape.

Since the input-side busbar is formed in a stepped shape by the input-side level difference and the output-side busbar is formed in a stepped shape by the output-side level difference, the large fuse is less likely to interfere with the busbar when mounted on the fuse mounting portion.

(4) It is preferable that the housing further includes a pair of fuse protection walls arranged on both sides of the fuse mounting portion, and the pair of fuse protection walls can be arranged at outer positions covering the large fuse from both sides and inner positions that are located inward relative to the outer positions and cover the small fuse from both sides.

The large fuse is protected by the pair of fuse protection walls at the outer positions, and the small fuse is protected by the pair of protection walls at the inner positions.

(5) It is preferable that the pair of fuse protection walls are movable in a width direction orthogonal to an axial direction and the height direction of the fuse and are linkable with each other via a gear.

When one fuse protection wall is moved, the other fuse protection wall can be moved via the gear.

Details of Embodiments of the Present Disclosure

Specific examples of an electrical connection box of the present disclosure will be described below with reference to the drawings. Note that the present disclosure is not limited to these examples, but is indicated by the claims, and modifications within the scope and meaning equivalent to the claims are intended to be encompassed therein.

Embodiment

An embodiment of the present disclosure will be described with reference to FIGS. 1 to 8. The electrical connection box 10 of this embodiment is mounted in a vehicle such as an electric vehicle or a hybrid vehicle, and is disposed in a power supply path from a power source such as a battery to a load such as an auxiliary device.

Overall Configuration of Electrical Connection Box

As shown in FIG. 1, the electrical connection box 10 includes a housing 20, a busbar 30, a first fuse 40, and a second fuse 50. The first fuse 40 is located on the upper side of the housing 20 in FIG. 1, and the second fuse 50 is located on the lower side of the first fuse 40 in FIG. 1.

The housing 20 is made of synthetic resin, and includes a lower case to which the busbar 30 and the like are fixed, and a cover (not shown) that is attached to the lower case from above and covers the busbar 30 and the like. In this embodiment, only the lower case is disclosed.

The busbar 30 is a member formed by punching and bending a metal plate material, and includes a first busbar 31, a second busbar 32, and a third busbar 33. The first busbar 31 is located on the right side of the housing 20 in FIG. 1, and the second busbar 32 and third busbar 33 are located on the left side of first busbar 31 in FIG. 1. The second busbar 32 is located above the third busbar 33 in FIG. 1.

The first busbar 31 has an external connection portion 31A, and a power source-side cable is connected to the external connection portion 31A. The power input from the external connection portion 31A to the first busbar 31 is branched and supplied to the first fuse 40 and the second fuse 50. The first busbar 31 includes a first fuse connection portion 31B connected to the first fuse 40 and a second fuse connection portion 31C connected to the second fuse 50.

The second busbar 32 includes a first fuse connection portion 32A connected to the first fuse 40, and the third busbar 33 includes a second fuse connection portion 33A connected to the second fuse 50. One load-side cable is connected to the first fuse connection portion 32A, and the other load-side cable is connected to the second fuse connection portion 33A. Accordingly, the power input from the power source-side cable is branched at the first busbar 31, and is then output to one load-side cable through the first fuse 40 and the second busbar 32 and output to the other load-side cable through the second fuse 50 and the third busbar 33.

Housing

The housing 20 includes a first fuse mounting portion 21 on which the first fuse 40 is mounted, and a second fuse mounting portion 22 on which the second fuse 50 is mounted. In the following, the first fuse mounting portion 21 will be described, and will be abbreviated as "fuse mounting portion 21".

Figure 2:
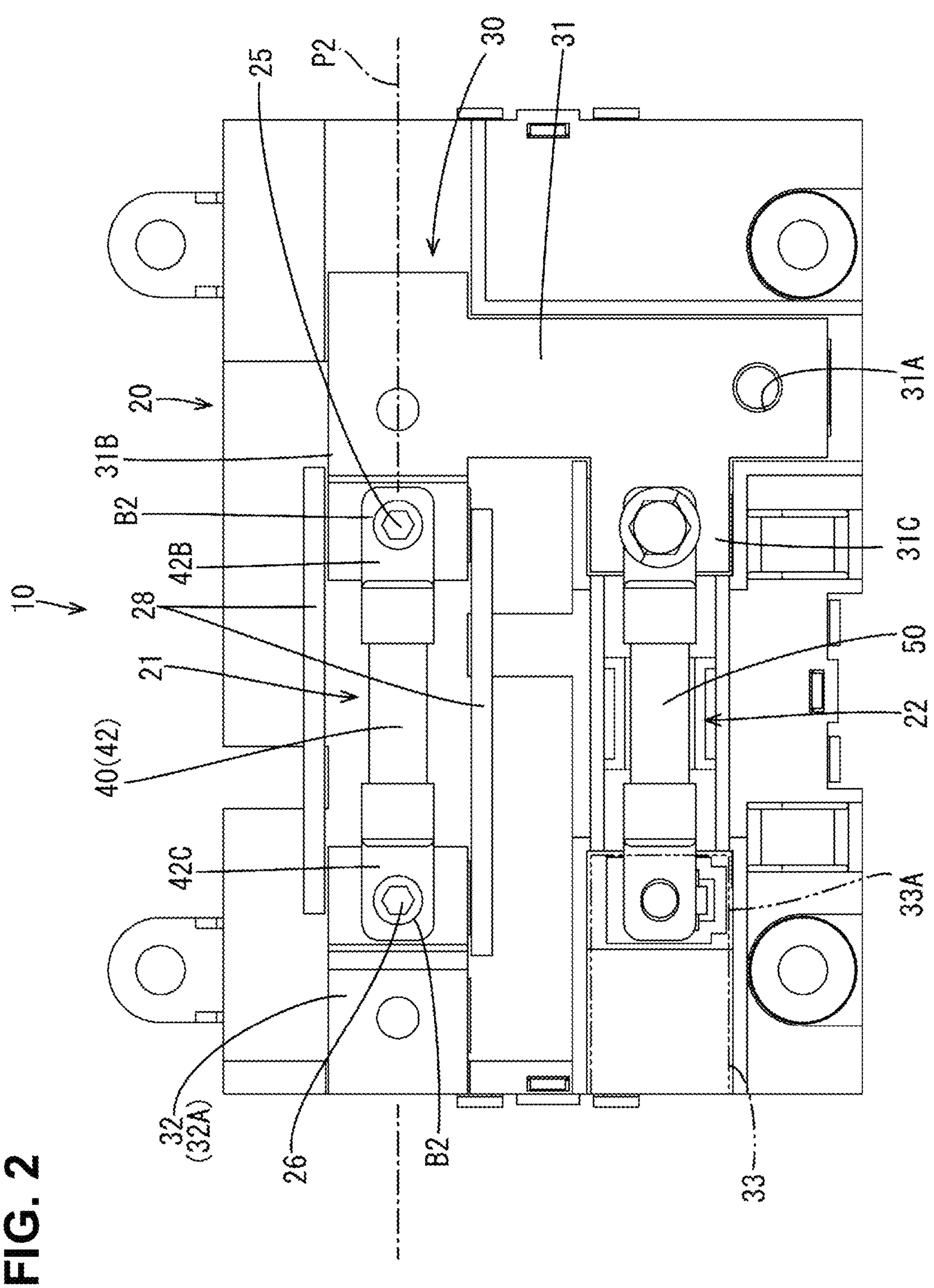
FIG. 2 is a plan view of an electrical connection box in which a small fuse is mounted.

The fuse mounting portion 21 is a shared fuse mounting portion 21 on which a large fuse 41 shown in FIG. 1 and a small fuse 42 shown in FIG. 2, which are of mutually different sizes, are mounted. The first fuse 40 is a collective term for the large fuse 41 and the small fuse 42.

Large Fuse

Figure 4:
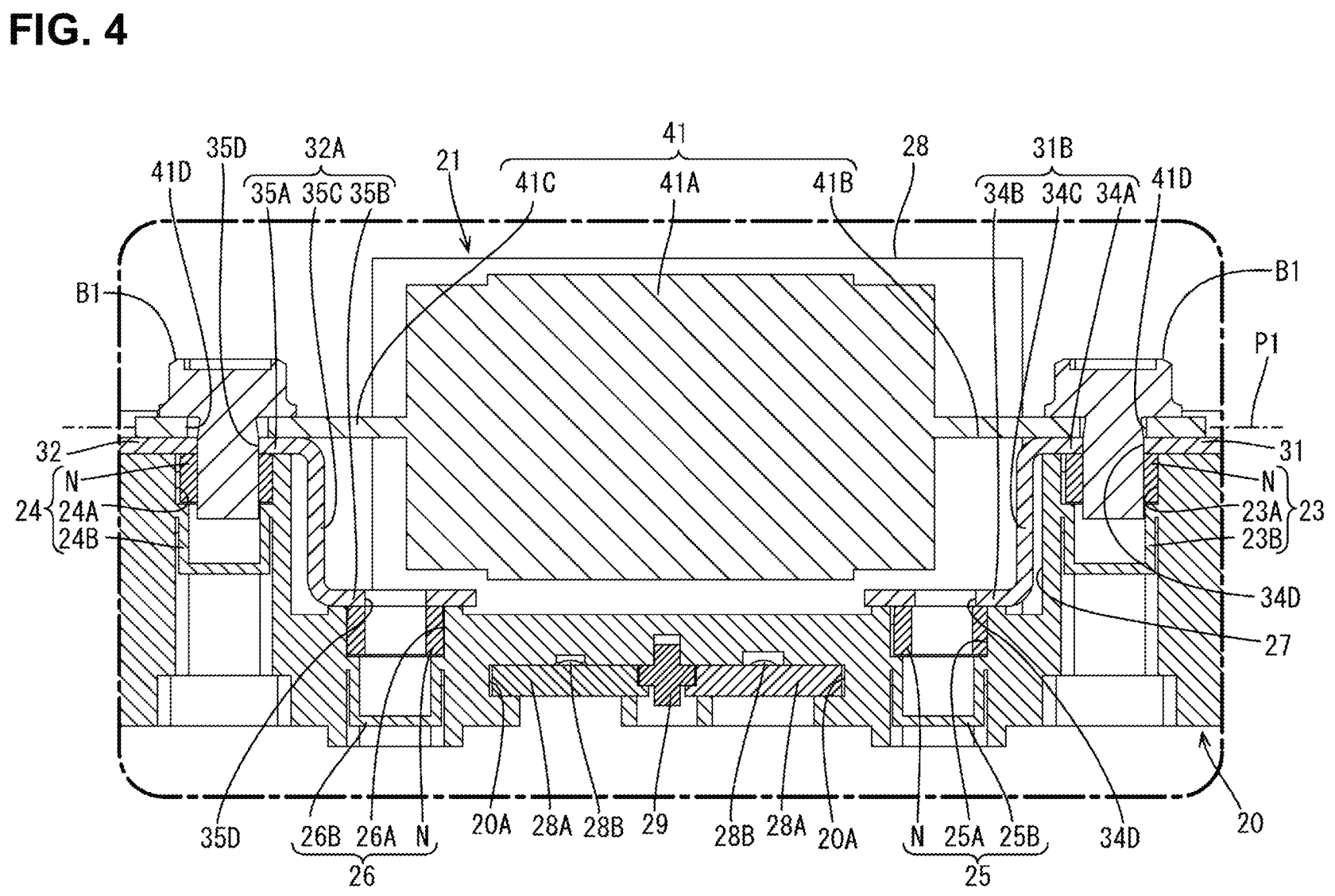

As shown in FIG. 4, the large fuse 41 includes a large fuse body 41A, a large input terminal 41B protruding from one end portion of the large fuse body 41A, and a large output terminal 41C protruding from the other end portion of the large fuse body 41A. The large fuse body 41A is approximately cylindrical and extends along an axis P1 passing through its center. The large input terminal 41B and the large output terminal 41C are both formed in flat plate shapes and extend along the axis P1. Both the large input terminal 41B and the large output terminal 41C have bolt holes 41D.

Small Fuse

Figure 8:
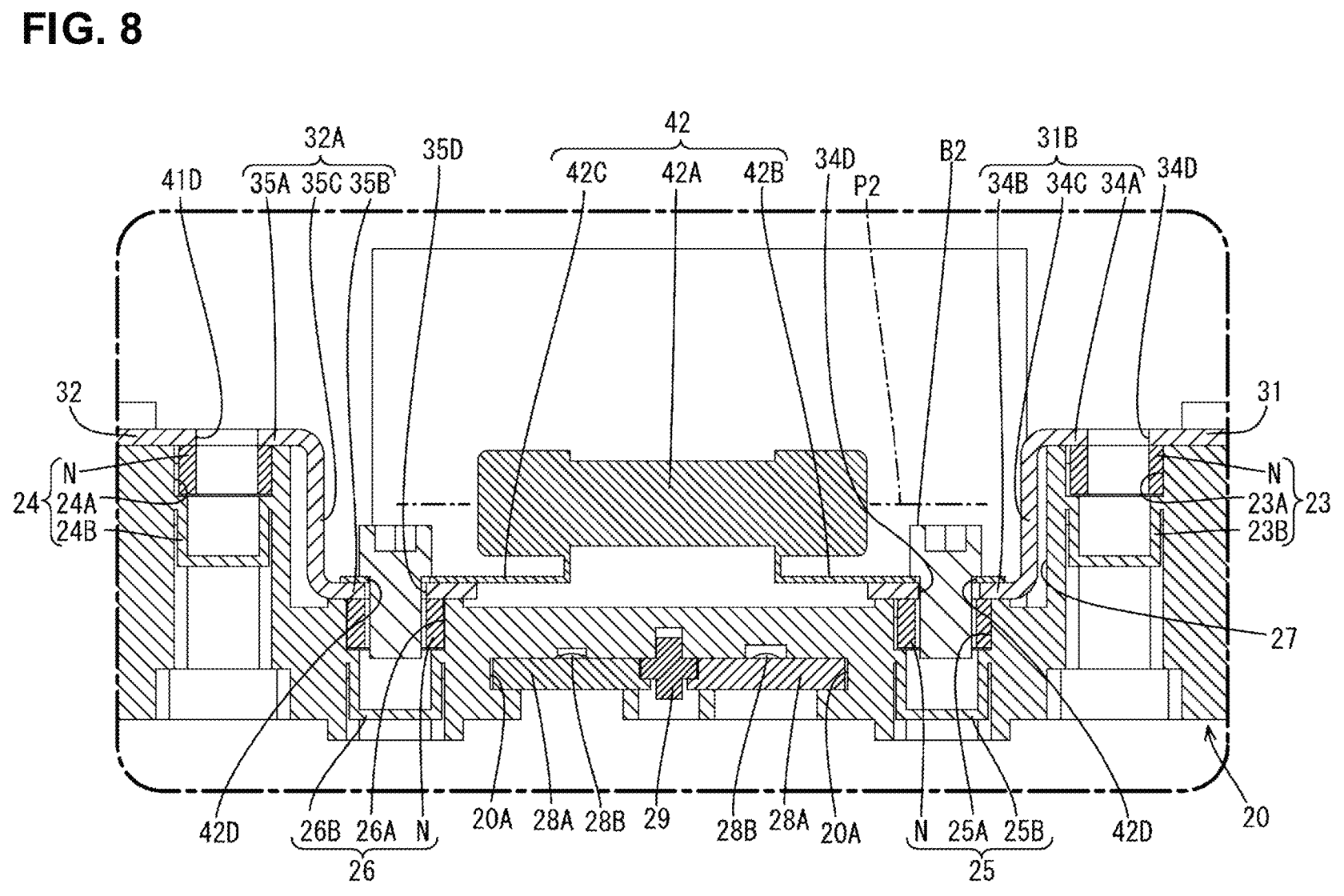

As shown in FIG. 8, the small fuse 42 includes a small fuse body 42A, a small input terminal 42B that protrudes downward from the lower surface on one end of the small fuse body 42A and then protrudes to the right side in the drawing, and a small output terminal 42C that protrudes downward from the lower surface on the other end of the small fuse body 42A and then protrudes to the left side in the drawing. The small fuse body 42A is approximately cylindrical and extends in the direction of an axis P2. The small input terminal 42B and the small output terminal 42C are both flat and extend along the axis P2. Both the small input terminal 42B and the small output terminal 42C have bolt holes 42D.

The dimension of the large fuse body 41A in the direction of the axis P1 is greater than the dimension of the small fuse body 42A in the direction of the axis P2. In addition, the diameter of the large fuse body 41A is greater than the diameter of the small fuse body 42A. The plate thickness of the large input terminal 41B and the large output terminal 41C is greater than the plate thickness of the small input terminal 42B and the small output terminal 42C.

Fuse Mounting Portion

The fuse mounting portion 21 includes a large input-side fixing portion 23 to which the large input terminal 41B is fixed, a large output-side fixing portion 24 to which the large output terminal 41C is fixed, a small input-side fixing portion 25 to which the small input terminal 42B is fixed, and a small output-side fixing portion 26 to which the small output terminal 42C is fixed. The small input-side fixing portion 25 and the small output-side fixing portion 26 are arranged between the large input-side fixing portion 23 and the large output-side fixing portion 24.

The portion of the fuse mounting portion 21 in which the small input-side fixing portion 25 and the small output-side fixing portion 26 are formed is configured as a recess 27 formed recessed downward relative to the portion in which the large input-side fixing portion 23 and the large output-side fixing portion 24 are formed. As shown in FIG. 4, the recess 27 accommodates the lower half of the large fuse body 41A. As shown in FIG. 8, the small fuse 42 is entirely accommodated in the recess 27.

As shown in FIG. 4, the large input-side fixing portion 23 includes a nut N, a nut accommodation portion 23A that accommodates the nut N so that it cannot rotate, and a bolt escape portion 23B that allows a shaft portion of a large bolt B1 to escape. The large output-side fixing portion 24, the small input-side fixing portion 25, and the small output-side fixing portion 26 have the same configuration as the large input-side fixing portion 23.

The large output-side fixing portion 24 includes a nut N, a nut accommodation portion 24A, and a bolt escape portion 24B, the small input-side fixing portion 25 includes a nut N, a nut accommodation portion 25A, and a bolt escape portion 25B, and the small output-side fixing portion 26 includes a nut N, a nut accommodation portion 26A, and a bolt escape portion 26B.

Connection Structure of Large Fuse

The first fuse connection portion 31B of the first busbar 31 is formed along the outer surface of the large fuse 41. The first fuse connection portion 31B has a large input-side connection portion 34A that is fixed to the large input-side fixing portion 23 while connected to the large input terminal 41B, a small input-side connection portion 34B that is fixed to the small input-side fixing portion 25 while connected to the small input terminal 42B, and an input-side level difference 34C that connects the large input-side connection portion 34A and the small input-side connection portion 34B in a stepped shape. The large input-side connection portion 34A is disposed at a higher position than the small input-side connection portion 34B in a height direction orthogonal to the direction of the axes P1 and P2. Both the large input-side connection portion 34A and the small input-side connection portion 34B have bolt holes 34D.

The first fuse connection portion 32A of the second busbar 32 has a large output-side connection portion 35A that is fixed to the large output-side fixing portion 24 while connected to the large output terminal 41C, a small output-side connection portion 35B that is fixed to the small output-side fixing portion 26 while connected to the small output terminal 42C, and an output-side level difference 35C that connects the large output-side connection portion 35A and the small output-side connection portion 35B in a stepped shape. The large output-side connection portion 35A is disposed at a higher position than the small output-side connection portion 35B in the height direction orthogonal to the direction of the axes P1 and P2. Both the large output-side connection portion 35A and the small output-side connection portion 35B have bolt holes 35D.

The dimension between the large input-side fixing portion 23 and the large output-side fixing portion 24 is larger than the dimension between the small input-side fixing portion 25 and the small output-side fixing portion 26, and the large input-side fixing portion 23, the small input-side fixing portion 25, the small output-side fixing portion 26, and the large output-side fixing portion 24 are arranged side by side in a row in the stated order in a plan view. In a plan view, the alignment direction in which the large input-side fixing portion 23, the small input-side fixing portion 25, the small output-side fixing portion 26, and the large output-side fixing portion 24 are arranged side by side coincides with the direction of the axes P1 and P2.

As shown in FIG. 4, the bolt hole 34D of the large input-side connection portion 34A and the nut N of the large input-side fixing portion 23 are aligned coaxially. When the large input terminal 41B is placed on the large input-side connection portion 34A, the bolt hole 34D of the large input-side connection portion 34A, the nut N of the large input-side fixing portion 23, and the bolt hole 41D of the large input terminal 41B are aligned coaxially. When the bolt B1 is inserted into the bolt holes 34D and 41D and fastened to the nut N, the large input terminal 41B and the large input-side connection portion 34A are sandwiched between the head of the bolt B1 and the nut N, whereby the first fuse connection portion 31B of the first busbar 31 and the large input terminal 41B of the large fuse 41 are fixed to the large input-side fixing portion 23 in a conductively connected state.

The bolt hole 35D of the large output-side connection portion 35A and the nut N of the large output-side fixing portion 24 are aligned coaxially. When the large output terminal 41C is placed on the large output side connection portion 35A, the bolt hole 35D of the large output-side connection portion 35A, the nut N of the large output-side fixing portion 24, and the bolt hole 41D of the large output terminal 41C are aligned coaxially. When the bolt B1 is inserted into the bolt holes 35D and 41D and fastened to the nut N, the large output terminal 41C and the large output-side connection portion 35A are sandwiched between the head of the bolt B1 and the nut N, and thereby the first fuse connection portion 32A of the second busbar 32 and the large output terminal 41C of the large fuse 41 are fixed to the large output-side fixing portion 24 in a conductively connected state.

Connection Structure of Small Fuse

As shown in FIG. 8, the bolt hole 34D of the small input-side connection portion 34B and the nut N of the small input-side fixing portion 25 are aligned coaxially. When the small input terminal 42B is placed on the small input-side connection portion 34B, the bolt hole 34D of the small input-side connection portion 34B, the nut N of the small input-side fixing portion 25, and the bolt hole 42D of the small input terminal 42B are aligned coaxially. When a bolt B2, which is smaller than the bolt B1, is inserted into the bolt holes 34D and 42D and fastened to the nut N, the small input terminal 42B and the small input-side connection portion 34B are sandwiched between the head of the bolt B2 and the nut N, and thereby the first fuse connection portion 31B of the first busbar 31 and the small input terminal 42B of the small fuse 42 are fixed to the small input-side fixing portion 25 in a conductively connected state.

The bolt hole 35D of the small output-side connection portion 35B and the nut N of the small output-side fixing portion 26 are aligned coaxially. When the small output terminal 42C is placed on the small output-side connection portion 35B, the bolt hole 35D of the small output-side connection portion 35B, the nut N of the small output-side fixing portion 26, and the bolt hole 42D of the small output terminal 42C are aligned coaxially. When the bolt B2 is inserted into the bolt holes 35D and 42D and fastened to the nut N, the small output terminal 42C and the small output-side connection portion 35B are sandwiched between the head of the bolt B2 and the nut N, and thereby the first fuse connection portion 32A of the second busbar 32 and the small output terminal 42C of the small fuse 42 are fixed to the small output-side fixing portion 26 in a conductively connected state.

Fuse Protection Wall

As shown in FIG. 1, the housing 20 includes a pair of fuse protection walls 28 arranged on both sides of the fuse mounting portion 21 in the width direction. Here, the width direction refers to a direction orthogonal to the direction of the axis P1 and the height direction. The pair of fuse protection walls 28 can be arranged at outer positions shown in FIG. 1 and at inner positions shown in FIG. 2. The pair of fuse protection walls 28 at the inner positions are located more inward than the pair of fuse protection walls 28 at the outer positions. The pair of fuse protection walls 28 located at the outer positions cover the large fuse 41 from both sides in the width direction, and the pair of fuse protection walls 28 located at the inner positions cover the small fuse 42 from both sides in the width direction.

As shown in FIG. 4, the fuse protection walls 28 are formed to be larger than the large fuse 41 and smaller than the recess 27 in the direction of the axis P1. In addition, the fuse protection walls 28 are formed to be larger than the large fuse 41 and larger than the recess 27 in the height direction. That is, although the upper half of the large fuse 41 protrudes from the recess 27, this protruding portion is covered from both sides in the width direction by the pair of fuse protection walls 28.

Figure 5:
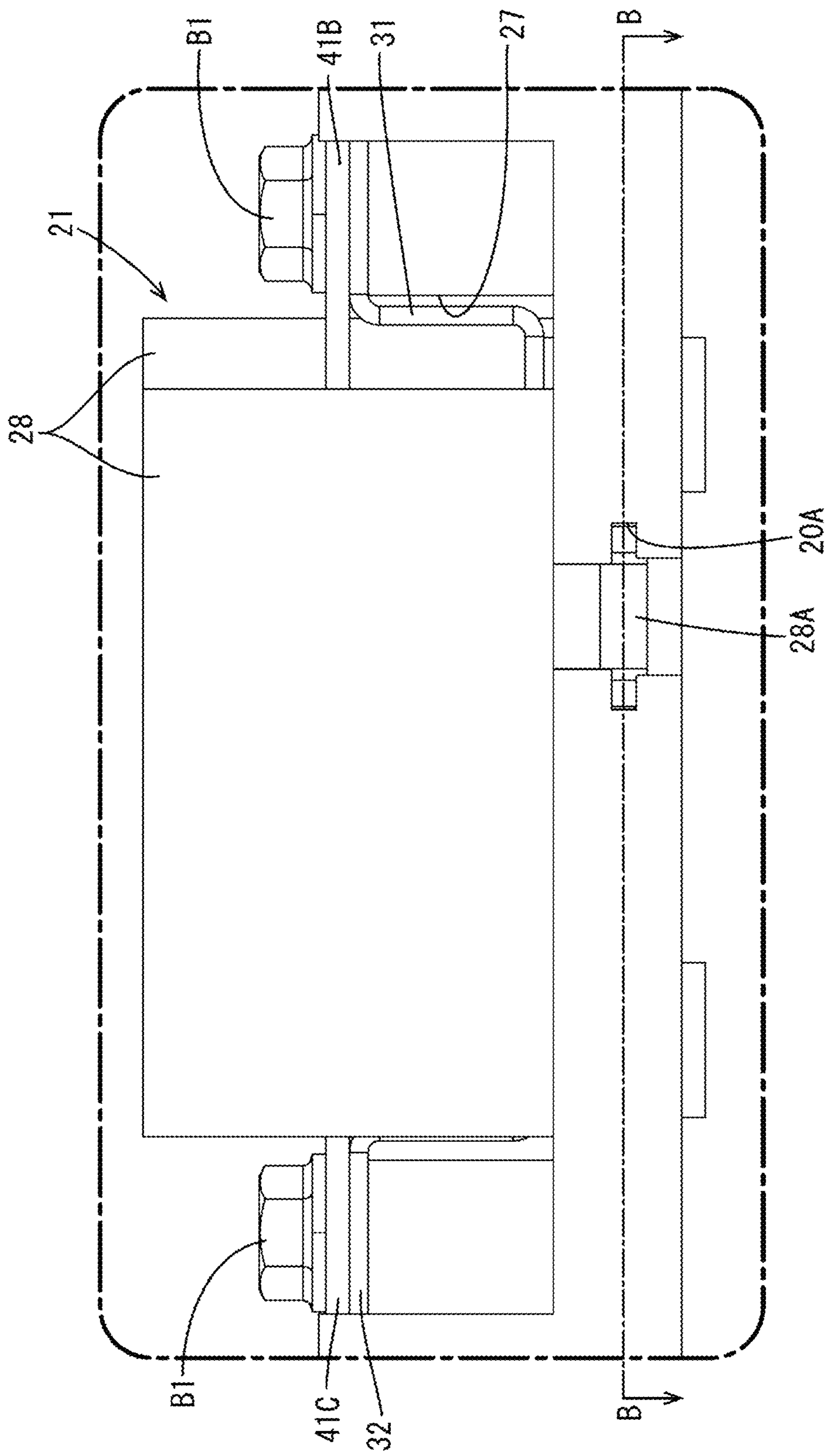
FIG. 5 is a partially enlarged rear view of the electrical connection box showing an enlarged fuse mounting portion on which the large fuse is mounted.

As shown in FIG. 5, inner rails 28A are provided at the lower end portion of the fuse protection wall 28. The inner rails 28A are disposed orthogonal to the fuse protection walls 28 and extend in the width direction. On the other hand, outer rails 20A into which the inner rails 28A can be inserted are provided at the lower end portion of the housing 20. The inner rails 28A move along the outer rails 20A, thereby allowing the fuse protection walls 28 to move in the width direction between the outer positions and the inner positions.

Protrusions 28B are provided on the upper surfaces of the inner rails 28A. On the other hand, the inner surfaces of the outer rails 20A are provided with a pair of recesses into which the protrusions 28B fit, at outer and inner positions. The protrusions 28B of the inner rails 28A fit into the recesses of the outer rails 20A, whereby the fuse protection walls 28 are positioned and held at the outer and inner positions.

Figure 6:
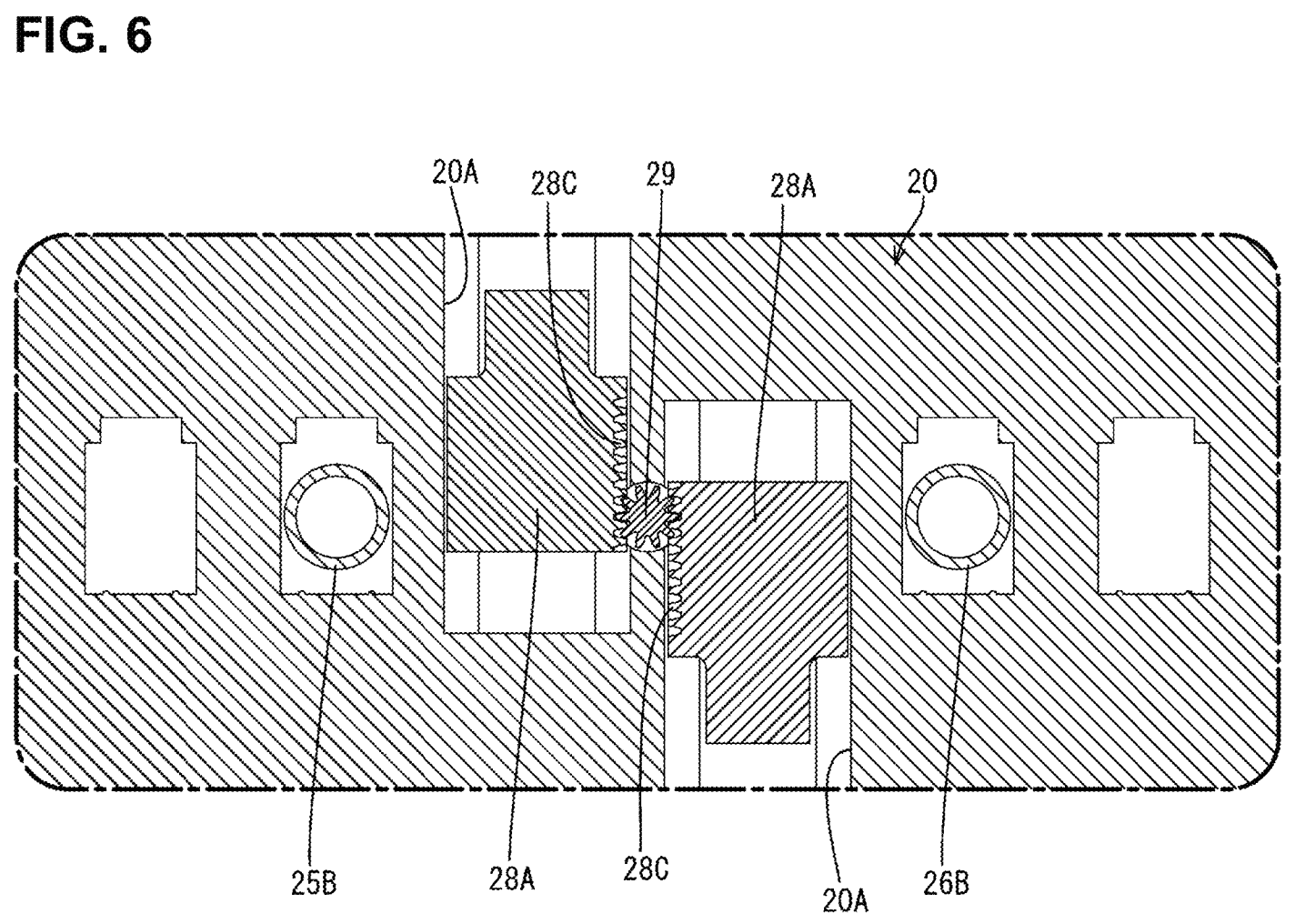

As shown in FIG. 6, a pair of the inner rails 28A are disposed symmetrically with respect to a gear 29. The inner rails 28A have teeth 28C that mesh with the gear 29. The gear 29 is sandwiched between the pair of inner rails 28A and simultaneously meshes with the teeth 28C. For this reason, the pair of fuse protection walls 28 can be linked together via the gear 29. Accordingly, when one fuse protection wall 28 is moved to one side in the width direction, the other fuse protection wall 28 also moves to the other side in the width direction accordingly.

Effects of the Embodiment

The electrical connection box 10 of the present disclosure is an electrical connection box 10 including includes a housing 20 and a busbar 30 attached to the housing 20. The housing 20 includes a shared fuse mounting portion 21 on which a large fuse 41 and a small fuse 42 of mutually different sizes are mounted. The fuse mounting portion 21 includes: a large input-side fixing portion 23 to which a large input terminal 41B provided at one end of the large fuse 41 is fixed; a large output-side fixing portion 24 to which a large output terminal 41C provided at another end of the large fuse 41 is fixed; a small input-side fixing portion 25 to which a small input terminal 42B provided at one end of the small fuse 42 is fixed; and a small output side fixing portion 26 to which a small output terminal 42C provided at another end of the small fuse 42 is fixed. The small input-side fixing portion 25 and the small output-side fixing portion 26 are arranged between the large input-side fixing portion 23 and the large output-side fixing portion 24.

In order to mount the large fuse 41 on the fuse mounting portion 21, the large input terminal 41B is fixed to the large input-side fixing portion 23 and the large output terminal 41C is fixed to the large output-side fixing portion 24. In order to mount the small fuse 42 on the fuse mounting portion 21, the small input terminal 42B is fixed to the small input-side fixing portion 25 and the small output terminal 42C is fixed to the small output-side fixing portion 26. Since the large fuse 41 and the small fuse 42 can be mounted on one fuse mounting portion 21 in this manner, at least two fuses of different sizes can be mounted in the same electrical connection box 10, thereby reducing cost.

It is preferable that the busbar 30 includes: a first busbar 31 having a large input-side connection portion 34A that is fixed to the large input-side fixing portion 23 while connected to the large input terminal 41B and a small input-side connection portion 34B that is fixed to the small input-side fixing portion 25 while connected to the small input terminal 42B; and a second busbar 32 having a large output-side connection portion 35A that is fixed to the large output-side fixing portion 24 while connected to the large output terminal 41C and a small output-side connection portion 35B that is fixed to the small output-side fixing portion 26 while connected to the small output terminal 42C.

In order to connect the large fuse 41 to the first busbar 31, the large input-side connection portion 34A is fixed to the large input-side fixing portion 23 together with the large input terminal 41B, and in order to connect the large fuse 41 to the second busbar 32, the large output-side connection portion 35A is fixed to the large output-side fixing portion 24 together with the large output terminal 41C. In order to connect the small fuse 42 to the first busbar 31, the small input-side connection portion 34B is fixed to the small input-side fixing portion 25 together with the small input terminal 42B, and in order to connect the small fuse 42 to the second busbar 32, the small output-side connection portion 35B is fixed to the small output-side fixing portion 26 together with the small output terminal 42C. In this way, it is possible to select either the large fuse 41 or the small fuse 42 to connect the first busbar 31 and the second busbar 32 to each other, and therefore the same electrical connection box 10 can be used for different vehicle models and grades.

It is preferable that the large input-side connection portion 34A and the small input-side connection portion 34B are arranged at different height positions in a height direction orthogonal to a direction in which the large input-side connection portion 34A and the small input-side connection portion 34B are arranged side by side in a plan view, the first busbar 31 has an input-side level difference 34C that connects the large input-side connection portion 34A and the small input-side connection portion 34B in a stepped shape, the large output-side connection portion 35A and the small output-side connection portion 35B are arranged at different height positions in a height direction orthogonal to a direction in which the large output-side connection portion 35A and the small output-side connection portion 35B are arranged side by side in a plan view, and the second busbar 32 has an output-side level difference 35C that connects the large output-side connection portion 35A and the small output-side connection portion 35B in a stepped shape.

Since the first busbar 31 is formed in a stepped shape by the input-side level difference 34C and the second busbar 32 is formed in a stepped shape by the output-side level difference 35C, the large fuse 41 is less likely to interfere with the busbar 30 when mounted on the fuse mounting portion 21.

It is preferable that the housing 20 further includes the pair of fuse protection walls 28 arranged on both sides of the fuse mounting portion 21, and the pair of fuse protection walls 28 can be arranged at outer positions covering the large fuse 41 from both sides and inner positions that are located inward relative to the outer positions and cover the small fuse 42 from both sides.

The large fuse 41 is protected by the pair of fuse protection walls 28 at the outer positions, and the small fuse 42 is protected by the pair of fuse protection walls 28 at the inner positions.

It is preferable that the pair of fuse protection walls 28 are movable in the width direction orthogonal to the direction of the axes P1 and P2 and the height direction, and are linkable with each other via a gear 29.

When one fuse protection wall 28 is moved, the other fuse protection wall 28 can be moved via the gear 29.

Other Embodiments (1) In the above embodiment, an example was illustrated in which the fuse mounting portion 21 has the recess 27, but the fuse mounting portion may also have a flat shape.

(2) In the above embodiment, an example was illustrated in which the first busbar 31 has the input-side level difference 34C and the second busbar 32 has the output-side level difference 35C, but the busbars do not necessarily need to have a stepped shape. For example, the first busbar may be formed in a branched shape, with a large input-side connection portion and a small input-side connection portion provided at the leading end of each branch.

(3) In the above embodiment, an example was illustrated in which the large fuse 41 and the small fuse 42 are connected to the busbar 30, but the fuses 41 and 42 may not be connected to the busbar 30 and may simply be held in the housing 20 as spare fuses.

(4) In the above embodiment, an example was illustrated in which the terminals 41B, 41C, 42B, and 42C of the fuses 41 and 42 are fastened to the housing 20 by the bolts B1 and B2. However, the fixing method does not need to be fastening by the bolts B1 and B2. For example, the fixing method may be welding, or a fixing method using a resin lock, a metal clip, or the like.

(5) In the above embodiment, the fuse mounting portion 21 on which two fuses of different sizes (the large fuse 41 and the small fuse 42) can be selectively mounted was illustrated. However, it is also possible to use a fuse mounting portion on which three or more fuses of different sizes can be selectively mounted.

(6) In the above embodiment, an example was illustrated in which the large input-side fixing portion 23, the small input-side fixing portion 25, the small output-side fixing portion 26, and the large output-side fixing portion 24 are arranged side by side in a row in the stated order in a plan view. However, they do not necessarily need to be arranged in a row. For example, the fixing portions may be provided in an arrangement in which the axis P1 of the large fuse 41 and the axis P2 of the small fuse 42 are eccentric with each other or intersect each other.

(7) In the above embodiment, the fuse protection wall 28 formed as a separate member from the housing 20 was illustrated, but the fuse protection wall may be formed in one piece with the housing.

(8) In the above embodiment, the pair of fuse protection walls 28 are linked by a rack-and-pinion mechanism using the gear 29. However, the pair of fuse protection walls may be linked by, for example, a link mechanism.

LIST OF REFERENCE NUMERALS

10: Electrical connection box
20: Housing,
20A: Outer rail,
21: First fuse mounting portion (fuse mounting portion), 22: Second fuse mounting portion,
23: Large input-side fixing portion,
23A: Nut accommodation portion,
23B: Bolt escape portion,
24: Large output-side fixing portion,
24A: Nut accommodation portion,
24B: Bolt escape portion,
25: Small input-side fixing portion,
25A: Nut accommodation portion,
25B: Bolt escape portion,
26: Small output-side fixing portion,
26A: Nut accommodation portion,
26B: Bolt escape portion,
27: Recess,
28: Fuse protection wall,
28A: Inner rail,
28B: Protrusion,
28C: Teeth,
29: Gear
30: Busbar,
31: First busbar (input-side busbar),
31A: External connection portion,
31B: First fuse connection portion,
31C: Second fuse connection portion,
32: Second busbar (output-side busbar),
32A: First fuse connection portion,
33: Third busbar,
33A: Second fuse connection portion,
34A: Large input-side connection portion,
34B: Small input-side connection portion,
34C: Input-side level difference,
34D: Bolt hole,
35A: Large output-side connection portion,
35B: Small output-side connection portion,
35C: Output-side level difference,
35D: Bolt hole
40: First fuse,
41: Large fuse,
41A: Large fuse body,
41B: Large input terminal,
41C: Large output terminal,
41D: Bolt hole,
42: Small fuse,
42A: Small fuse body,
42B: Small input terminal,
42C: Small output terminal,
42D: Bolt hole
50: Second fuse
B1: Bolt,
B2: Bolt,
N: Nut,
P1: Axis,
P2: Axis

The invention claimed is:

1. An electrical connection box comprising:
a housing; and
a busbar attached to the housing,
wherein the housing includes a shared fuse mounting portion on which at least two fuses including a large fuse and a small fuse of mutually different sizes are to be mounted,
the fuse mounting portion includes: a large input-side fixing portion to which a large input terminal provided on one end of the large fuse is to be fixed; a large output-side fixing portion to which a large output terminal provided on another end of the large fuse is to be fixed; a small input-side fixing portion to which a small input terminal provided on one end of the small fuse is to be fixed; and a small output-side fixing portion to which a small output terminal provided on another end of the small fuse is to be fixed, and
the small input-side fixing portion and the small output-side fixing portion are arranged between the large input-side fixing portion and the large output-side fixing portion.

2. The electrical connection box according to claim 1, wherein the busbar includes: an input-side busbar having a large input-side connection portion that is to be fixed to the large input-side fixing portion while connected to the large input terminal and a small input-side connection portion that is to be fixed to the small input-side fixing portion while connected to the small input terminal; and an output-side busbar having a large output-side connection portion that is to be fixed to the large output-side fixing portion while connected to the large output terminal and a small output-side connection portion that is to be fixed to the small output-side fixing portion while connected to the small output terminal.

3. The electrical connection box according to claim 2, wherein the large input-side connection portion and the small input-side connection portion are arranged at different height positions in a height direction orthogonal to a direction in which the large input-side connection portion and the small input-side connection portion are arranged side by side in a plan view, and the input-side busbar has an input-side level difference that connects the large input-side connection portion and the small input-side connection portion in a stepped shape, and
the large output-side connection portion and the small output-side connection portion are arranged at different height positions in a height direction orthogonal to a direction in which the large output-side connection portion and the small output-side connection portion are arranged side by side in a plan view, and the output-side busbar has an output-side level difference that connects the large output-side connection portion and the small output-side connection portion in a stepped shape.

4. The electrical connection box according to claim 1, wherein the housing further includes a pair of fuse protection walls arranged on both sides of the fuse mounting portion, and
the pair of fuse protection walls can be arranged at outer positions covering the large fuse from both sides and inner positions that are located inward relative to the outer positions and cover the small fuse from both sides.

5. The electrical connection box according to claim 4, wherein the pair of fuse protection walls are movable in a width direction orthogonal to an axial direction and the height direction of the fuse and are linkable with each other via a gear.

* * * * *